United States Patent
Kim et al.

(10) Patent No.: US 8,801,059 B2
(45) Date of Patent: Aug. 12, 2014

(54) IMPACT ABSORBING DEVICE FOR VEHICLE

(71) Applicant: Hyundai Motor Company, Seoul (KR)

(72) Inventors: Jun Hyoung Kim, Seongnam-si (KR); Daekun Seo, Pohang-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/711,487

(22) Filed: Dec. 11, 2012

(65) Prior Publication Data

US 2014/0062107 A1    Mar. 6, 2014

(30) Foreign Application Priority Data

Sep. 3, 2012 (KR) .......................... 10-2012-0097312

(51) Int. Cl.
*B60R 19/34* (2006.01)
(52) U.S. Cl.
CPC ..................................... *B60R 19/34* (2013.01)
USPC ............................ 293/133; 293/155; 293/102
(58) Field of Classification Search
USPC .......................................... 293/133, 155, 102
See application file for complete search history.

(56) References Cited

U.S. PATENT DOCUMENTS 7,874,601 B2 *    1/2011    Tanskanen .................... 293/133

FOREIGN PATENT DOCUMENTS

| JP | 2003-276533 A | 10/2003 | |
|---|---|---|---|
| JP | 2008-68849 A | 3/2008 | |
| JP | 2008-168897 A | 7/2008 | |
| KR | 10-2011-0023599 A | 3/2011 | |
| KR | 10-1061380 B1 | 3/2011 | |
| SE | WO2005080141 | * 9/2005 | ............. B60R 19/02 |

* cited by examiner

*Primary Examiner* — Dennis H Pedder
*Assistant Examiner* — Beverly Becker
(74) *Attorney, Agent, or Firm* — Morgan, Lewis & Bockius LLP

(57) ABSTRACT

An impact absorbing device for a vehicle may include a bumper beam having a hollow cross section which extends in a traverse direction of the vehicle, and crash boxes interposed between the bumper beam and a vehicle body in a longitudinal direction of the vehicle at both distal portions of the bumper beam, wherein rear surfaces of the both distal portions in the bumper beam include an opening formed so as to communicate with the hollow cross section of the bumper beam, wherein a rib may be formed at the opening of the bumper beam in a traverse direction of the opening, and wherein the crash box includes a front tip end inserted through the opening while being fitted to the rib to extend up to an inside of the hollow cross section, and a rear tip end mounted to the vehicle body in the longitudinal direction of the vehicle.

10 Claims, 6 Drawing Sheets

IMPACT ABSORBING DEVICE FOR VEHICLE

CROSS-REFERENCE TO RELATED APPLICATION

The present application claims priority to Korean Patent Application No. 10-2012-0097312 filed on Sep. 3, 2012, the entire contents of which is incorporated herein for all purposes by this reference.

BACKGROUND OF THE INVENTION

1. Field of the Invention

The present invention relates to an impact absorbing device for a vehicle, and more particularly, to an impact absorbing device for a vehicle in which a crash response length of a crash box extends.

2. Description of Related Art

In general, an impact absorbing device for a vehicle is mounted on a front side and a rear side according to a longitudinal direction of a vehicle so as to contribute to safety of passengers by absorbing impact when a vehicle crashes into a pedestrian, another vehicle, or an object and to simultaneously minimize deformation of a vehicle body.

Referring to FIGS. 1 and 2, an impact absorbing device for a vehicle in the related art includes bumper beams 1 manufactured in a beam shape to be disposed in a front side and a rear side of a vehicle in a traverse direction of the vehicle and crash box units 3 mounted at both side portions of the bumper beam 1 in the traverse direction of the vehicle in a rear side of the bumper beam 1.

The crash box units 3 are mounted to both side portions of the bumper beam 1 through a stay bracket 2 and are directly mounted to side members 4 to be supported.

The side members 4 extend from both left and right sides in the traverse direction of the vehicle in a longitudinal direction of the vehicle to constitute a vehicle body.

The crash box unit 3 includes a crash box 31 generally shaped like a quadrangular block and a mounting bracket 32 for mounting the crash box 31 to the side member 4.

An opening is formed at a rear surface of the bumper beam 1 in the longitudinal direction of the vehicle, and a tip end of the crash box 31 is inserted through the opening to be fixedly mounted to the bumper beam 1 through the stay bracket 2.

A rear end of the crash box 31 is fixedly mounted to the side member 4 through the mounting bracket 32.

A plurality of beads 31a is formed in a longitudinal direction for the crash box 31, thereby enhancing strength of the crash box 31.

A length L between the tip end of the crash box 31 connected to the bumper beam 1 and the rear end connected to the side member 4 is a minimum of 130 mm to 150 mm in order to prevent damage of a head lamp, a hood, a cooling module, or components mounted to a front side of the vehicle body in a front crash of the vehicle.

In the front crash of the vehicle, the bumper beam 1 and the crash box 31 receive impact and absorb crash energy while being deformed to reduce the crash energy. Accordingly, as a length of the crash box 31 is increased, efficiency of crash energy absorption of the crash box 31 is increased.

However, there is an evitable limit in designing the length L of the crash box 31 due to a limitation of a specification or a design of a vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an impact absorbing device for a vehicle having advantages of improving crash response performance of a crash box by forming the crash box at a limited space between a bumper beam and a side member as long as possible.

In an aspect of the present invention, an impact absorbing device for a vehicle, may include a bumper beam having a hollow cross section which extends in a traverse direction of the vehicle, and crash boxes interposed between the bumper beam and a vehicle body in a longitudinal direction of the vehicle at both distal portions of the bumper beam, wherein rear surfaces of the both distal portions in the bumper beam may include an opening formed so as to communicate with the hollow cross section of the bumper beam, wherein a rib is formed at the opening of the bumper beam in a traverse direction of the opening, and wherein the crash box may include a front tip end inserted through the opening while being fitted to the rib to extend up to an inside of the hollow cross section, and a rear tip end mounted to the vehicle body in the longitudinal direction of the vehicle.

The inside of the hollow cross section to which the front tip end extends is a front surface of the bumper beam.

The vehicle body is a side member.

The rear surfaces of the both distal portions in the bumper beam may include a vertical surface and an inclined surface inclined downwardly from the vertical surface, wherein the opening may include a first opening formed at the vertical surface and a second opening formed at the inclined surface, and wherein the rib is formed at a boundary of the first opening and the second opening.

The rib is formed so as to extend in the traverse direction of the vehicle from one edge of the opening to the other edge facing the one edge by passing through the opening.

The front tip end of the crash box may include a slit to which the rib is fitted to be inserted therein.

The slit extends while being dug so as to may have a predetermined length from the front tip end toward the rear tip end at vertical sides of the front tip end, which face each other.

A sectional area of the front tip end of the crash box is formed to be smaller than a sectional area of the rear tip end.

A sectional area of the crash box is reduced from the front tip end of the crash box while extending toward the rear tip end thereof.

The front tip end of the crash box is mounted to a rear surface of the bumper beam by a stay bracket, wherein the rear tip end of the crash box is mounted to the vehicle body by a mounting bracket, and wherein a plurality of beads is formed at both side surfaces of the crash box facing each other in the traverse direction of the vehicle in a longitudinal direction of the crash box.

The front tip end of the crash box extends to a front surface of the bumper beam.

As described above, the crash box may be elongated by a length inserted in the bumper beam at a limited space between the bumper beam and the side member, thereby improving efficiency of crash energy absorption of the crash box.

The improvement of the efficiency of crash energy absorption of the crash box may increase a degree of freedom in a design and reduce crash damage to the vehicle body and other components, thereby reducing repair expenses of the vehicle.

Further, when the crash box absorbs more crash energy, safety of a passenger in the front crash of the vehicle is also improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
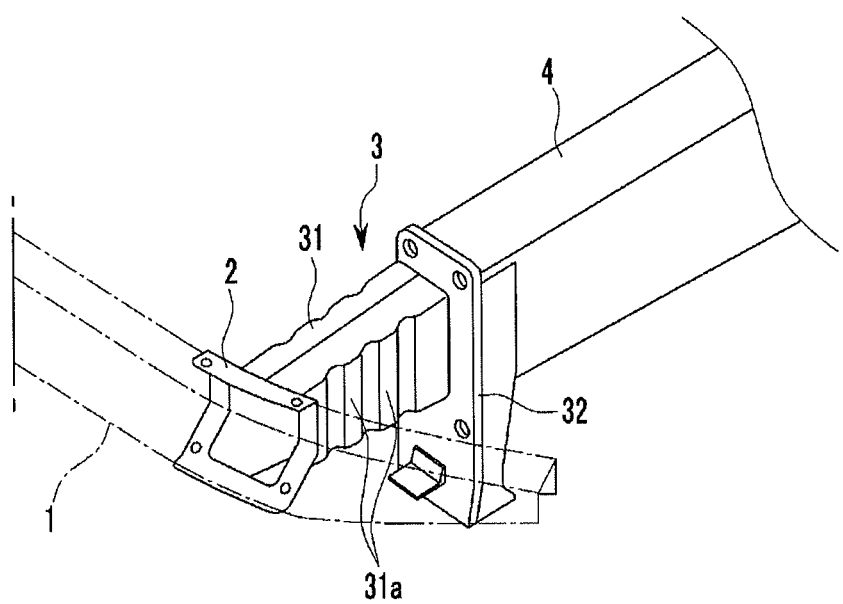
FIG. 1 is a perspective view of an impact absorbing device for a vehicle according to the related art.
Figure 2:
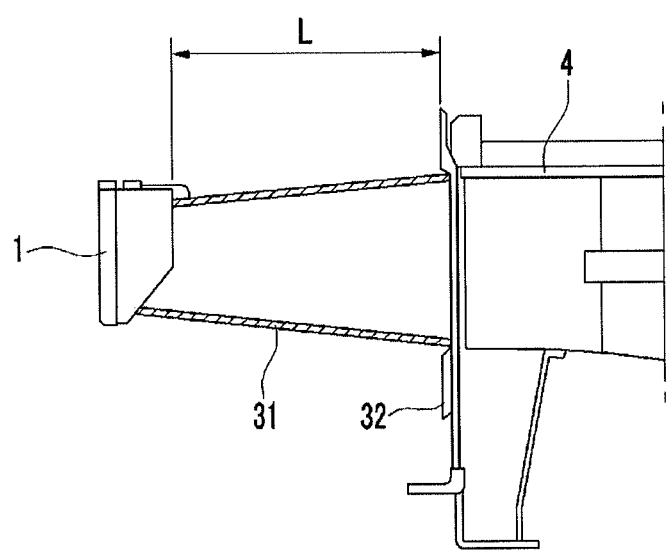
FIG. 2 is a cross-sectional view in a longitudinal direction of FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Figure 3:
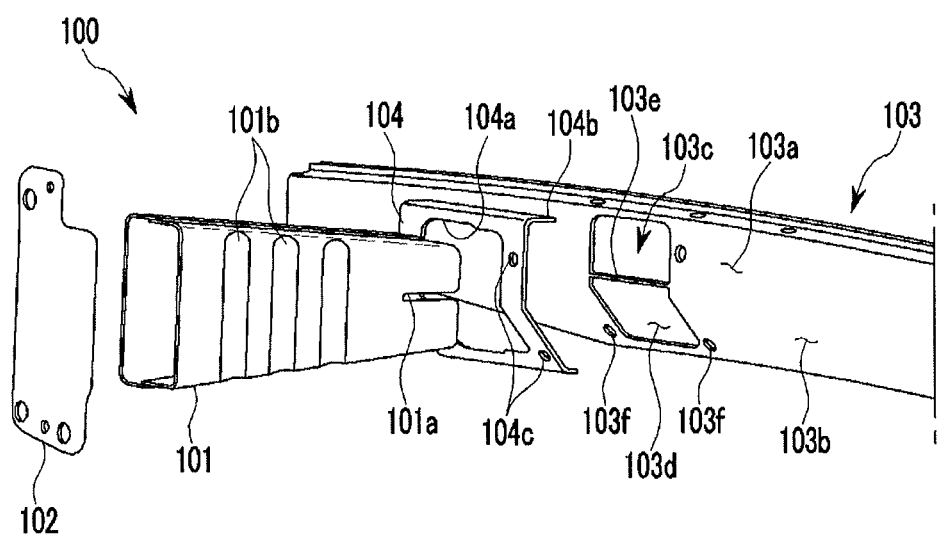
FIG. 3 is an exploded perspective view of an impact absorbing device for a vehicle according to an exemplary embodiment of the present invention.

Referring to FIG. 3, an impact absorbing device 100 for a vehicle according to an exemplary embodiment of the present invention includes a crash box 101 and a bumper beam 103.

The crash box 101 is formed in a shape of a hollow quadrangular box having an empty interior.

An opening is formed at each of a front side and a rear side of the crash box 101 in a longitudinal direction of the crash box 101.

A sectional area of the crash box 101 varies in the longitudinal direction of the crash box 101. That is, the sectional area of a front side in the longitudinal direction of the crash box is a relatively smaller than that of the rear side of the crash box.

The sectional area is gradually increased as a section becomes close to a section of the rear side from the section of the front side.

In the exemplary embodiment of the present invention, a sectional area of the crash box 101 is varied in the longitudinal direction of the crash box 101, but it is not essentially limited thereto, and the sectional area may be identically formed in the longitudinal direction of the crash box 101.

A slit 101a is formed at a front tip end in the longitudinal direction of the crash box 101. The slit 101a is positioned at a center portion in a height direction of the front tip end.

The slit 101a is formed at vertical sides of the front tip end which face each other, and extend while being dug so as to have a predetermined length from the front tip end to the rear tip end.

A plurality of beads 101b is formed at both facing side surfaces of the crash box 101 in the traverse direction of the vehicle at a predetermined interval in the longitudinal direction of the crash box.

The respective beads 101b are formed while extending in a height direction of each side surface at the both side surfaces, and protrude outward from the respective side surfaces.

A mounting bracket 102 may be integrally attached to the rear tip end of the crash box 101 by welding. The mounting bracket 102 is formed so as to generally have a quadrangular plate shape.

The bumper beam 103 extends in the traverse direction of the vehicle while having a beam shape having a hollow section with an empty interior so that the front tip end of the crash box 101 may be inserted in and mounted to the bumper beam 103.

The rear surface of the bumper beam 103 in the longitudinal direction of the vehicle includes a vertical surface 103a and an inclined surface 103b inclined downwardly from the vertical surface 103a.

An opening communicating with the hollow interior of the bumper beam 103 is formed at the rear surface of each of the both sides in the longitudinal direction of the bumper beam 103. The opening includes a first opening 103c formed at the vertical surface 103a and a second opening 103d formed at the inclined surface 103b.

The first opening 103c and the second opening 103d are divided by a rib 103e formed in the traverse direction of the vehicle.

The rib 103e is formed so as to extend in the traverse direction of the vehicle from one edge of the opening to the other edge facing the one edge.

The rib 103e is formed so as to be positioned at a boundary between the vertical surface 103a and the inclined surface 103b.

The front tip end of the crash box 101 is mounted to the bumper beam 103 through the stay bracket 104.

The stay bracket 104 has a coupling hole 104a for fitting and attaching the front tip end of the crash box 101 to the stay bracket 104 by welding.

The stay bracket 104 is bent at a predetermined angle so as to be in close contact with each of the vertical surface 103a and the inclined surface 103b.

An upper end of the stay bracket 104 has a horizontally bent flange 104b. The flange 104 is assembled with the bumper beam 103 while being seated on an upper surface of the bumper beam 103.

A plurality of coupling holes 104c for coupling the stay bracket 104 to the bumper beam 103 is formed around the coupling hole 104a of the stay bracket 104. A plurality of coupling holes 103f is also formed at the bumper beam 103 in correspondence to the plurality of coupling holes 104c.

Figure 4:
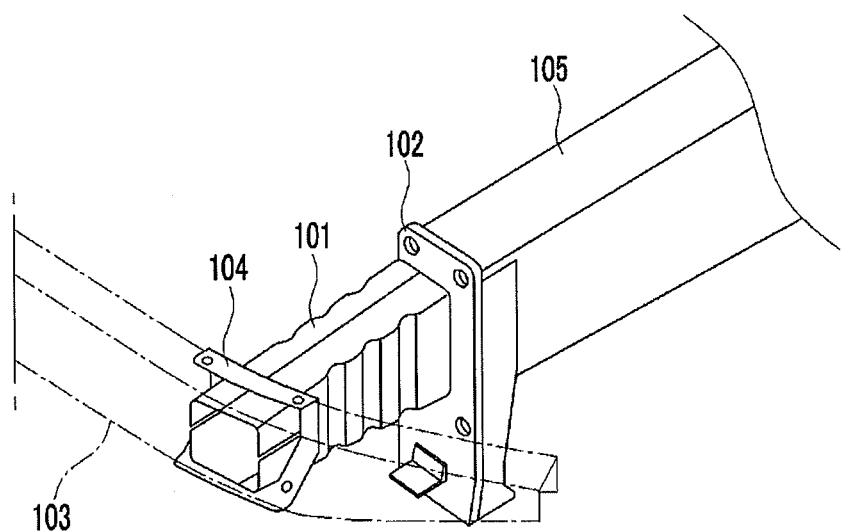
FIG. 4 is a perspective view of an impact absorbing device for a vehicle according to an exemplary embodiment of the present invention.
Figure 5:
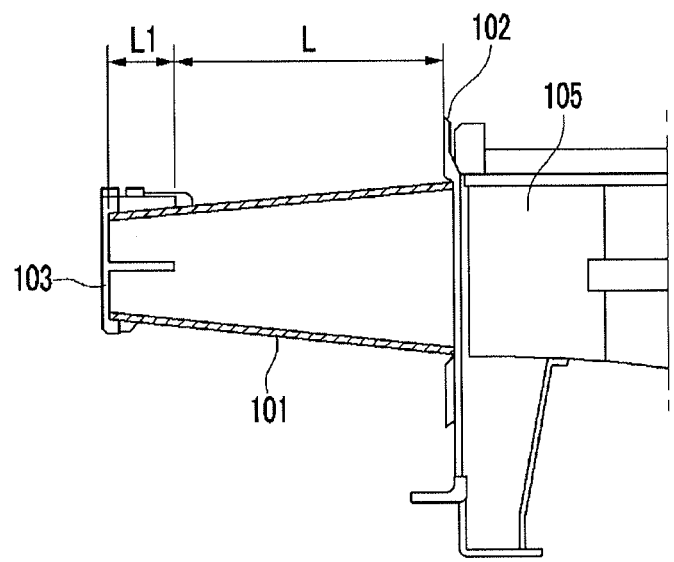
FIG. 5 is a cross-sectional view in a longitudinal direction of FIG. 4.

Referring to FIGS. 4 and 5, the front tip end of the crash box 101 is mounted to the bumper beam 103 through the stay bracket 104 in a state where the front tip of the crash box 101 is inserted inside the bumper beam 103 through the opening of the bumper beam 103.

The front end of the crash box 101 may be connected with the stay bracket 104 by welding while being inserted in the stay bracket 104 through the coupling hole 104a of the stay bracket 104, and the stay bracket 104 may be fastened to the bumper beam 103 through a bolt.

The mounting bracket 102 is attached to the rear tip end of the crash box 101, and the mounting bracket 102 is mounted to the side member 105 constituting the vehicle body, so that the crash box 101 is interposed between the bumper beam 103 and the side member 105.

The rib 103e of the bumper beam 103 is fitted in the slit 101a of the crash box 101.

The crash box 101 has a length L from a rear surface of the bumper beam 103 to a front surface of the side member 105, and an insertion length L1 inserted inside the bumper beam 103.

Since the crash box 101 may be elongated (L+L1) by the insertion length L1 compared to the length L of the crash box of the related art, crash response performance of the crash box is improved.

Figure 6:
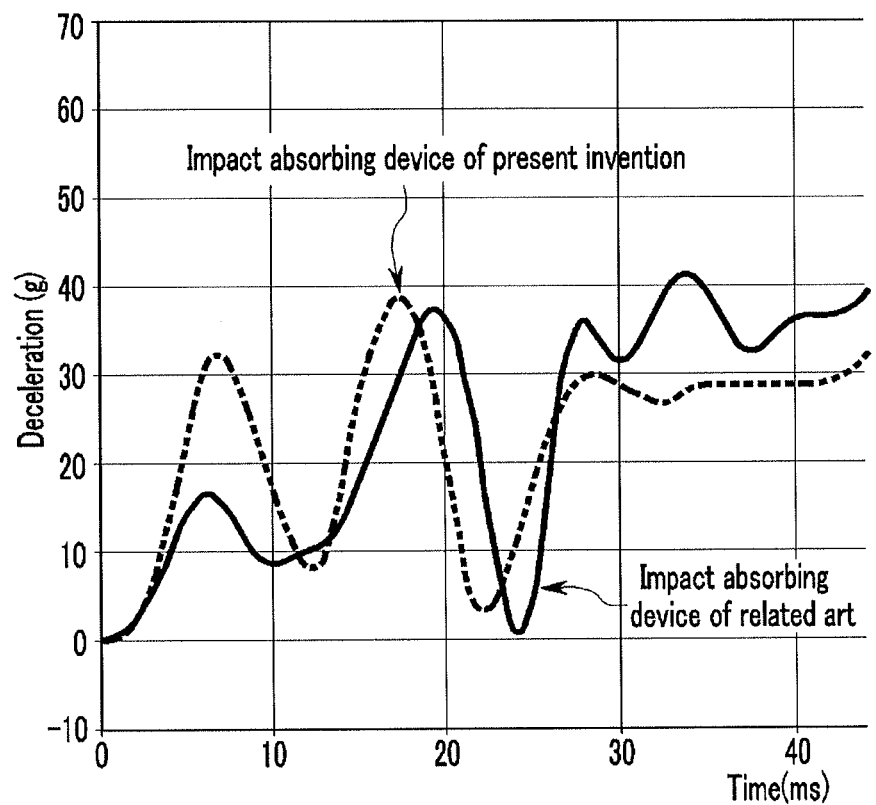
FIG. 6 is a graph of comparison of crash response performance between an impact absorbing device according to the related art and an impact absorbing device according to an exemplary embodiment of the present invention.

That is, as illustrated in FIG. 6, according to a crash test of the mounted impact absorbing device according to an exemplary embodiment of the present invention and the mounted impact absorbing device according to the related art, an initial peak value of deceleration is increased in the impact absorbing device according to an exemplary embodiment of the present invention compared to the impact absorbing device according to the related art, so that crash response performance is improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A impact absorbing device for a vehicle, comprising:
    a bumper beam having a hollow cross section which extends in a traverse direction of the vehicle; and
    crash boxes interposed between the bumper beam and a vehicle body in a longitudinal direction of the vehicle at both distal portions of the bumper beam,
    wherein rear surfaces of the both distal portions in the bumper beam include an opening formed so as to communicate with the hollow cross section of the bumper beam,
    wherein a rib is formed at the opening of the bumper beam in a traverse direction of the opening, and
    wherein the crash box includes a front tip end inserted through the opening while being fitted to the rib to extend up to an inside of the hollow cross section, and a rear tip end mounted to the vehicle body in the longitudinal direction of the vehicle; and
    wherein the rear surfaces of the both distal portions in the bumper beam include a vertical surface and an inclined surface inclined downwardly from the vertical surface,
    wherein the opening includes a first opening formed at the vertical surface and a second opening formed at the inclined surface, and
    wherein the rib is formed at a boundary of the first opening and the second opening.

2. The impact absorbing device of claim 1, wherein the inside of the hollow cross section to which the front tip end extends is a front surface of the bumper beam.

3. The impact absorbing device of claim 1, wherein the vehicle body is a side member.

4. The impact absorbing device of claim 1, wherein the rib is formed so as to extend in the traverse direction of the vehicle from one edge of the opening to the other edge facing the one edge by passing through the opening.

5. The impact absorbing device of claim 4, wherein a sectional area of the crash box is increased from the front tip end of the crash box while extending toward the rear tip end thereof.

6. The impact absorbing device of claim 1, wherein the front tip end of the crash box includes a slit to which the rib is fitted to be inserted therein.

7. The impact absorbing device of claim 6, wherein the slit extends while being dug so as to have a predetermined length from the front tip end toward the rear tip end at vertical sides of the front tip end, which face each other.

8. The impact absorbing device of claim 6, wherein a sectional area of the front tip end of the crash box is formed to be smaller than a sectional area of the rear tip end.

9. The impact absorbing device of claim 1,
    wherein the front tip end of the crash box is mounted to a rear surface of the bumper beam by a stay bracket,
    wherein the rear tip end of the crash box is mounted to the vehicle body by a mounting bracket, and
    wherein a plurality of beads is formed at both side surfaces of the crash box facing each other in the traverse direction of the vehicle in a longitudinal direction of the crash box.

10. The impact absorbing device of claim 9, wherein the front tip end of the crash box extends to a front surface of the bumper beam.

* * * * *